US006919034B2

(12) United States Patent
Kozak, III

(10) Patent No.: US 6,919,034 B2
(45) Date of Patent: Jul. 19, 2005

(54) SYSTEM AND METHOD FOR SEPARATING IMMISCIBLE FLUIDS

(75) Inventor: Andrew F. Kozak, III, Media, PA (US)

(73) Assignee: Apartar Technologies Inc., Media, PA (US)

( * ) Notice: Subject to any disclaimer, the term of this patent is extended or adjusted under 35 U.S.C. 154(b) by 0 days.

(21) Appl. No.: 10/644,819

(22) Filed: Aug. 21, 2003

(65) Prior Publication Data

US 2004/0035784 A1 Feb. 26, 2004

Related U.S. Application Data

(60) Provisional application No. 60/404,782, filed on Aug. 21, 2002.

(51) Int. Cl.$^7$ .............................. C02F 1/40; B01D 17/02
(52) U.S. Cl. ...................................... 210/799; 210/513
(58) Field of Search ................................ 210/799, 800, 210/513

(56) References Cited

U.S. PATENT DOCUMENTS

| 2,985,305 | A | * | 5/1961 | Bentley et al. | ............. | 210/746 |
| 4,521,312 | A | * | 6/1985 | Anderson | ................... | 210/744 |
| 5,145,586 | A | * | 9/1992 | Taggart et al. | .............. | 210/708 |
| 5,304,303 | A | | 4/1994 | Kozak, III | | |
| 5,464,529 | A | | 11/1995 | Kozak, III | | |
| 5,597,493 | A | * | 1/1997 | Torini | ......................... | 210/799 |
| 6,164,458 | A | * | 12/2000 | Mandrin et al. | ............ | 210/521 |

FOREIGN PATENT DOCUMENTS

EP          0119014 A2 *  9/1984

OTHER PUBLICATIONS

Joseph M. Desimone, "Practical Approaches to Green Solvents", Green Chemistry Viewpoint, www.sciencemag.org, Science vol. 397, Aug. 2, 2002, p. 799–803.

* cited by examiner

Primary Examiner—Fred G. Prince
(74) Attorney, Agent, or Firm—Rosenberg, Klein & Lee

(57) ABSTRACT

A system and method for separating immiscible fluids are provided. The system (10) includes a hollow vessel (50) which receives a mixture (20) of a first fluid (40) and a second fluid (60), which are immiscible with respect to one another. The density of the first fluid (40) is less than the density of the second fluid (60). The mixture (20) is pumped into the hollow vessel (50) by a pump (110) where it is received by a primary tube (80). The primary tube (80) is immersed in a separation medium (70). The separation medium has a density greater than the density of the first fluid (40) and less than the density of the second fluid (60). The second fluid (60) settles out of the separation medium (70) and the first fluid (40) rises above the separation medium (70). The first fluid (40) and the second fluid (60) can then be drained separately from the hollow vessel (50).

19 Claims, 1 Drawing Sheet

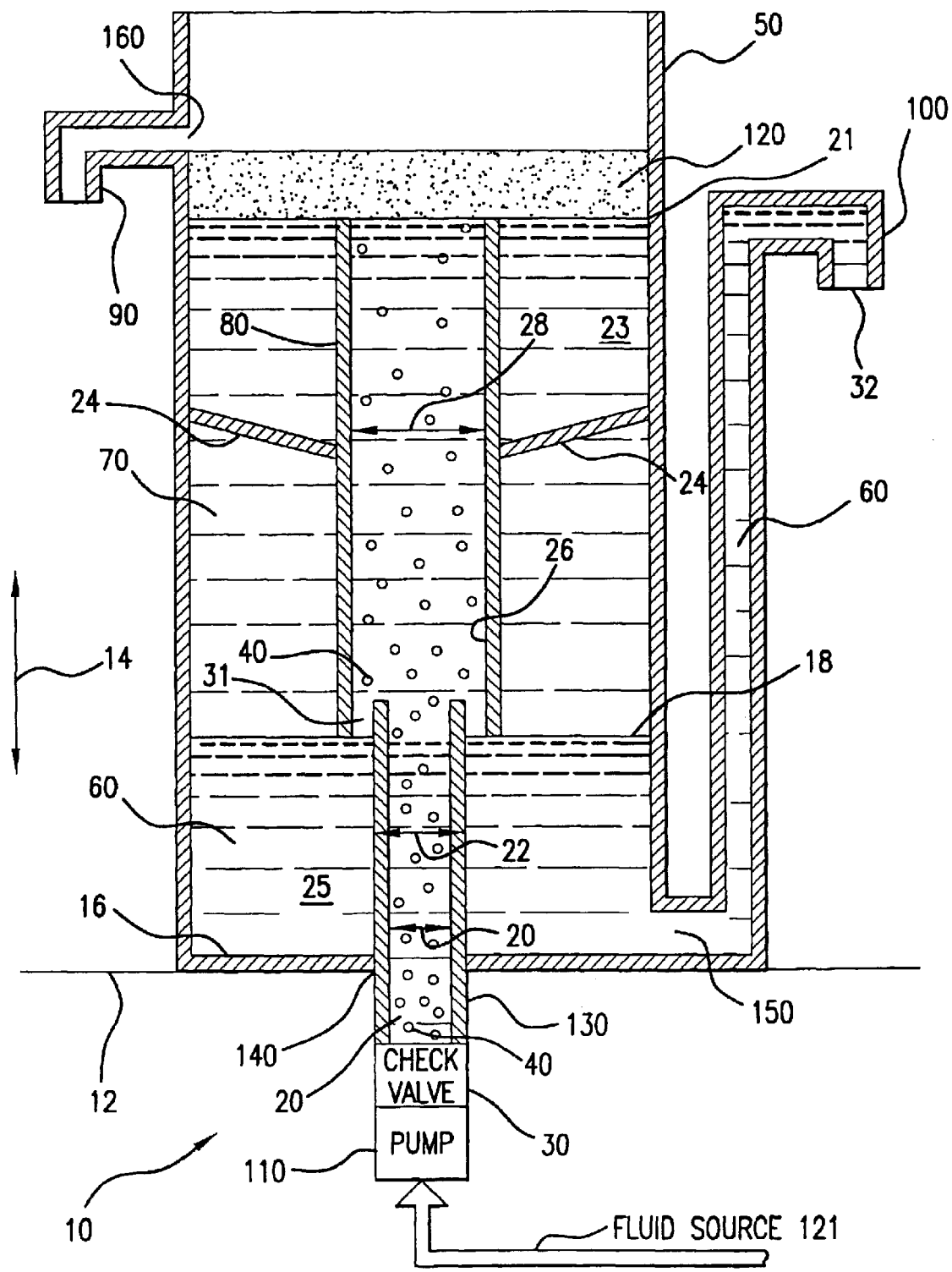

SYSTEM AND METHOD FOR SEPARATING IMMISCIBLE FLUIDS

REFERENCE TO RELATED APPLICATIONS

The subject Utility Patent Application is based on and claims priority under 35 USC 119(e) to Provisional Patent Application No. 60/404,782, filed on Aug. 21, 2002.

BACKGROUND OF THE INVENTION

1. Field of the Invention

The subject invention concept relates to both a system and method for separation of mixtures of fluids into the individual constituent fluids. In particular, the present invention directs itself to the separation of immiscible fluid compositions.

Still further, the invention directs itself to a system and method for separating a mixture of two immiscible fluids where the mixture of two immiscible fluids is separated into their constituent compositions. The subject invention relates to the separation of a mixture of a first and second immiscible fluid through use of a third immiscible fluid having predetermined density.

Further, the subject invention directs itself to the use of a separation medium or composition having a density which is less than the density of one of the fluids being separated and greater than the density of the other of the fluids being separated.

Still further, the invention concept directs itself to the charging of a container for the receipt of a mixture of a pair of immiscible fluids. Still further, the subject invention relates to a charging of a hollow vessel containing a quantity of a separation medium or composition having a density which is greater than the density of a first fluid in the mixture and less than the density of a second fluid in the mixture. In this manner utilizing gravity assist, the second fluid in the mixture separates from the mixture and settles out of the mixture to settle in the container below the separation medium while the first fluid in the mixture separates from the mixture and rises above the separation medium.

More in particular, the invention directs itself to a system for separation of fluids which includes a primary tube mounted within the container and extending in a vertical direction above a base plane. More in particular, this invention directs itself to a secondary tube which accepts a mixture of a first and second immiscible fluid for insert into the primary tube within the container.

Additionally, the invention is directed to the concept of preventing currents and turbulence in the separating medium from hindering the separation process through use of the enclosing primary and secondary tubes inserted within the container.

Still further, this invention is directed to a system and method for separating a first and second immiscible fluid composition into substantially pure first fluids and second fluids wherein one of the fluids separated is removed from a container in a lower region thereof and the second fluid is removed from the container in an upper region thereof.

2. Prior Art

Separation systems and processes for immiscible liquids are well-known in the art. In general, such prior art systems utilize a column or reservoir which receives a mixture of two immiscible liquids, and the liquid with the lowest density is allowed to naturally rise out of the liquid with the higher density. Such prior art systems typically only utilize the density difference between the two fluids to be separated. In the system and method of the present invention, however, a mixture of two immiscible fluids is injected into a third fluid or separation medium. The first fluid has a density less than the density of the separation medium and the second fluid has a density greater than the density of the separation medium. Thus, the first fluid rises out and separates from the separation medium and the second fluid settles out and sinks below the separation medium. This allows for a uniform separation process, ensuring optimal purity of the separated fluids. Additionally, the system of the present invention provides a primary tube received within the main hollow vessel, with the separation process taking place within the primary tube. The walls of the tube block any turbulence or currents which may be formed within the separation medium, thus preventing fluidic hindrance to the separation process.

One such prior art separation system is shown in "Practical Approaches to Green Solvents", Joseph M. DeSimone, Science Vol. 297, pgs. 799–803. The system for solvent extraction takes advantage of the immiscibility of the two fluids in the mixture and allows for the higher density fluid to settle out of the lower density fluid. The system does not include a separate separation medium, nor does it include a tube positioned within the main vessel for preventing currents and turbulence from interfering with the separation process.

Another such prior art separation system is shown in U.S. Pat. No. 5,304,303. This reference is directed to an apparatus and method for the separation of immiscible fluids. The system utilizes a main chamber for receiving a mixture of oil and water. The oil and water separate on their own based on their respective differences in density and the system does not include a separate separation medium. Additionally, the system does not provide a tube located within the separation chamber for preventing turbulence and currents within the mixture from interfering with separation.

U.S. Pat. No. 5,464,529 is directed to an apparatus and method for the separation of liquids. The system provides for the separation of water and oil, however, the system takes advantage of only the difference in specific gravities between the oil and water, it does not include a separate separation medium. Additionally, the system does not include a primary tube structure located within the separation chamber for preventing currents and turbulence in the mixture from interfering with the separation process.

None of the prior art provides for a combination of elements forming a system for the separation of immiscible fluids where a separate separation medium is utilized, with the separation medium having a density which is greater than the density of the first fluid in the mixture and the density which is less than the density of the second fluid in the mixture. Additionally, none of the prior art includes a primary tube structure located within the hollow separation vessel for preventing currents and turbulence in the separation medium from interfering with and hindering the separation process.

SUMMARY OF THE INVENTION

The present invention provides for a method and system for the separation of immiscible fluids. The system includes a hollow vessel for receiving a mixture of a first fluid and a second fluid, the first and second fluid being immiscible with respect to one another and having different densities. The hollow vessel also receives a quantity of a separation fluid with the separation fluid having a density which is greater than the density of the first fluid of the mixture and less than the density of the second fluid of the mixture. The mixture of the first and second fluids is injected into the separation medium and the first fluid rises out of the mixture and the separation medium and the second fluid settles out of the mixture and separation medium. The separation process takes place within the interior of a primary tube structure which is located within the hollow vessel and prevents turbulence and currents within the separation medium from interfering with and hindering the separation process. Once separated, the first and second fluids may be separately drained from the hollow vessel.

It is a principal objective of the subject system and method for the separation of immiscible fluids to provide a hollow vessel for receiving a mixture of first and second fluids, with the first and second fluids being immiscible with respect to one another and having differing densities from one another.

It is a further objective of the subject system and method for separating immiscible fluids to provide a separation medium which is received within the hollow vessel and has a density greater than the density of the first fluid of the mixture and a density which is less than the density of the second fluid of the mixture.

It is a further objective of the subject invention to provide a primary tube structure which is received within the hollow vessel and receives the mixture of the first and second fluid, with the separation process taking place within the primary tube structure.

It is an important objective of the present invention to provide drainage means for the separate removal of the first and second fluids after the two fluids have been separated from one another.

BRIEF DESCRIPTION OF THE DRAWING

The FIGURE is a schematic view of the subject system for separating immiscible fluids.

DESCRIPTION OF THE PREFERRED EMBODIMENTS

Referring now to the FIGURE, there is shown system 10 for separating immiscible fluids. In general, three immiscible fluids are used in the subject system and method, however, additional immiscible fluids each with respect to the other may also be used in this system and method for separation. The important features of the immiscible fluids is that they have distinct and non-equal densities and that each is immiscible each with respect to the other.

As shown in the FIGURE, container or hollow vessel 50 receives a mixture of first fluid 40 and second fluid 60, each being immiscible with respect to the other and of different densities. Generally, first fluid 40 has a density which is less than the density of second fluid 60. The combination of first and second fluids 40 and 60 are charged into container 50 through fluid source 120 which may be a pipe or other type conduit. Container 50 extends above a base plane 12 in vertical direction 14 as depicted by the directional arrows shown in the FIGURE. In this manner, as will be seen in following paragraphs, separation of liquids may be attained through gravity assist. Container 50 may be mounted directly on base plane 12 or otherwise fixed thereto above base plane 12, not important to the inventive concept as herein described with the exception that container 50 extend in vertical direction 14 to permit gravity assist to aid in the separation process.

The mixture of first and second fluids 40 and 60 is shown as mixture 20 and although any immiscible fluids may be used, a common mixture 20 which has commercial applications is water having a density approximating 1 g per $cm^3$ and an oil composition where the oil composition has a density less than 1 $g/cm^3$.

Initially, mixture 20 (including first fluid 40 and second fluid 60) is pumped through a conduit 121 and is charged into container 50. Mixture 20 passes through conduit 121 and is inserted into pump 110, which may be a standard water pump commercially available. The water passing through pump 110 is inserted into one-way valve or check valve 30 and then is inserted into secondary tube 130 extending through a base or floor element 16 of container 50. Check valve 30 is a standard one-way valve which is commercially available.

Mixture 20 of first fluid 40 and second fluid 60 is thus inserted into secondary tube 130 which passes through floor member 16 of container 15 and extends in vertical direction 14 and above first interface surface 18. First interface surface 18 is the interface between separation medium 70 and second fluid 60, as will be detailed in following paragraphs.

Secondary tube 30 has an internal diameter 20 which is of predetermined value and an external diameter 22 of predetermined value. Mixture 20 is forced through the passageway created by secondary tube 130 and is driven by pump 110 into primary tube 80.

Primary tube 80 is mounted within container 50 through struts 24 or some like positioning structural components not important to the inventive concept as herein defined, with the exception that primary tube 80 be maintained in a substantially stationary position within container 50. Primary tube 80 includes flow passage 26 which has an internal diameter 28 greater than the external diameter 22 of secondary tube 130. In this manner, secondary tube 130 is positioned substantially concentric with passageway 26 of primary tube 80 to permit an annulus space 30 to be formed therebetween as shown in the FIGURE.

In this manner, mixture 20 is then forced through secondary tube 130 internal to primary tube 80. Additionally, container or hollow vessel 50 is formed with an input opening 140 located in a lower section or end of container 50. Additionally, a first fluid output opening 160 is formed through an upper end or section of container 50. Second fluid 60 is egressed from container 50 through output opening 150 formed in a lower region or section of vessel 50 adjacent to the lower section.

Water opening 150 is in fluid communication with standing column 100 for passage of second fluid 60 therethrough. Second fluid 60 is removed from standing column 100 through exit opening 32. Thus, in this manner, as previously discussed, secondary tube 130 is received within input opening 140 of container 50 and projects into the interior of hollow vessel 50. Secondary tube 130 extends internal to primary tube 80 and is received within the interior of primary tube 80. Primary tube 80 may generally be positioned central to the interior of the hollow vessel or container 50 as was previously described.

Separation medium or separation composition 70, which is immiscible with respect to both the first fluid 40 and second fluid 60 has a density which is less than the density of second fluid 60 and greater than the density of first fluid 40. In this manner, separation medium or composition 70 is maintained discretely from water 60 in the lower section of container 50 at first interface surface 18. Separation medium or composition 70 may be formed of a composition commercially referred to as Pure Silicon fluid 100cs manufactured by Clearco Products Co., Inc. of Bensalem, Pa., having a specific gravity of 0.953. Other types of separation mediums 70 may be used with the important consideration being that the separation medium be immiscible with respect to first and second fluids 40 and 60 and further have a density which is less than second fluid 60 and greater than first fluid 40. Use of separation medium 70 as previously described permits a uniformity in the separation of first fluid 40 from second fluid 60. This ensures optimal purity of resulting separated first fluid 40 and second fluid 60 within the system as herein described.

Mixture 20 enters primary tube 80 as previously described and is forced upward therethrough by the action of pump 110. Within primary tube 80 is the combination of separation medium or composition 70, first fluid 40 and second fluid 60. Second fluid 60 having a greater density than that of separation medium 70 (within primary tube 80) settles out of the overall mixture 20 and passes by gravity assist through annular opening 31. In a similar manner, first fluid 40, having a density less than the density of separation medium 70, rises within primary tube 80 and is expelled into upper region 120 being defined by second interface surface 21. In this manner, three separate regions namely upper region 120 consisting of substantially pure first fluid 40, second region 23 consisting of the separation medium, and lower region 25 are formed in discrete layers with discrete separation surfaces. The upper end of primary tube 80 is positionally located substantially adjacent interface surface 21 between immiscible first fluid 40 and separation medium 70. Similarly, a lower end of primary tube 80 is positionally located adjacent first interface surface 18 between immiscible separation fluid 70 and second fluid 60.

The combination of secondary tube 130 and primary tube 80 provides for a barrier against any stray currents or turbulence formed within separation medium 70 which may act to slow down or hinder the separation process of first and second fluids 40 and 60. With secondary tube 130 being inserted partially within primary tube 80, the mixture of first and second fluids 40 and 60 is charged into primary tube 80, however, the sidewalls of primary tube 80 do not permit external currents and reduces any possible turbulence which may occur. In this manner, the settling or egressing of second fluid 60 from tube 80 is made in a substantially continuous manner.

Separation medium 70 not only aids in the separation of fluids 40 and 60 from mixture 20, but maintains a separation of the first fluid 40 from second fluid 60. Once separated, separation medium 70 provides an effective barrier between the fluids and prevents subsequent mixing of the fluids for ensuring optimal purity of individual fluids after separation.

Once first and second fluids 40, 60 have been separated, second fluid 60 may be drained from hollow vessel 50 through second output opening 150 through standing column 100 and output opening 32. As shown in the FIGURE, standing column 100 is in fluid communication with second output opening 150 to drain second fluid 60. Similarly, first output opening 160 permits for drainage of first fluid 40 from region 120 through drainage pipe 90.

The subject invention system includes a method for separation immiscible fluids such as first fluid 40 and second fluid 60. The steps for separating the immiscible fluids includes establishing a mixture of first and second fluids 40 and 60. The first fluid 40 and second fluid 60 must be immiscible each with respect to the other and first fluid 40 must have a density less than the density of second fluid 60.

A container or hollow vessel 50 is established where the container 50 receives and holds a separation medium 70 with the separation medium 70 having a density greater than the density of first fluid 40 and less than the density of second fluid 60. A mixture of first and second fluids 40 and 60 are charged into separation medium 70 contained within container 50 and second fluid 60 is settled or driven by gravity assist from separation medium 70. First fluid 40 then rises in vertical direction 14 out of separation medium 70 due to the difference in the density and the immiscibility of the fluids each with respect to the other.

Although this invention has been described in connection with specific forms and embodiments thereof, it will be appreciated that various modifications other than those discussed above may be resorted to without departing from the spirit or scope of the invention. For example, functionally equivalent elements may be substituted for those specifically shown and described, and in the method steps described, particular steps may be reversed or interposed, all without departing from the spirit or scope of the invention as defined in the appended claims.

What is claimed is:

1. A system for separating immiscible fluids comprising:
   a hollow vessel having an upper end and a lower end, an input opening being formed through said lower end, a first output opening being formed through said upper end, a second output opening being formed through said hollow vessel adjacent said lower end, said input opening being adapted to receive a mixture of first and second fluids, said first and second fluids being immiscible with respect to one another, said first fluid having a density less than a density of said second fluid, said hollow vessel receiving a separation medium having a density greater than said density of said first fluid and less than said density of said second fluid, said separation medium being immiscible with respect to said first and second fluids;
   a primary tube being received within said hollow vessel;
   a secondary tube extending through said input opening and guiding said mixture of said first and second fluids within said primary tube, wherein said first and second fluids separate in said separation medium within said primary tube, said second fluid settling within said hollow vessel beneath said primary tube and being drained through said second output opening, said first fluid rising within said hollow vessel above said primary tube and being drained through said first output opening.

2. The system for separating immiscible fluids as recited in claim 1, wherein said separation medium is a silicone fluid.

3. The system for separating immiscible fluids as recited in claim 2, wherein said separation medium has a specific gravity of 0.953.

4. The system for separating immiscible fluids as recited in claim 1, wherein said first fluid is an oil.

5. The system for separating immiscible fluids as recited in claim 1, wherein said second fluid is water.

6. The system for separating immiscible fluids as recited in claim 1, wherein said secondary tube has a check valve mounted thereto for controlling flow of said mixture.

7. The system for separating immiscible fluids as recited in claim 1, further comprising a standing column in communication with said second output opening for draining said second fluid.

8. The system for separating immiscible fluids as recited in claim 1, further comprising a drainage tube in communication with said first output opening for draining said first fluid.

9. The system for separating immiscible fluids as recited in claim 1, further comprising a pump for driving said mixture into said secondary tube from a source of said mixture, said mixture being driven by said pump under pressure.

10. The system for separating immiscible fluids as recited in claim 1, wherein said primary tube has an upper end and a lower end.

11. The system for separating immiscible fluids as recited in claim 10, wherein an interface between said first fluid and said separation medium forms adjacent said upper end of said primary tube.

12. The system for separating immiscible fluids as recited in claim 10, wherein an interface between said second fluid and said separation medium forms adjacent said lower end of said primary tube.

13. A method for separating immiscible fluids comprising the steps of:
  (a) establishing a mixture of first and second fluids, said first and second fluids being immiscible with respect to one another, said first fluid having a density less than a density of said second fluid;
  (b) establishing a hollow vessel, said hollow vessel receiving a separation medium, said separation medium having a density greater than said density of said first fluid and less than said density of said second fluid;
  (c) providing a hollow tube, said hollow tube being received within said hollow vessel;
  (d) charging said first and second fluids into said separation medium, said first and second fluids being received within an interior region of said hollow tube, said hollow tube being immersed in said separation medium; and,
  (e) settling said second fluid by gravity assist out of said separation medium and permitting said first fluid to rise out of said separation medium.

14. The method for separating immiscible fluids as recited in claim 13, further including the step of removing said first fluid from said hollow vessel.

15. The method for separating immiscible fluids as recited in claim 13, further including the step of removing said second fluid from said vessel.

16. The method for separating immiscible fluids as recited in claim 13, wherein step (e) is followed by the formation of an interface between said first fluid and said separation medium.

17. The method for separating immiscible fluids as recited in claim 13, wherein step (e) is followed by the formation of an interface between said second fluid and said separation medium.

18. The method for separating immiscible fluids as recited in claim 13, wherein said step of charging said first and second fluids includes the regulation of flow of said first and second fluids by a check valve.

19. The method for separating immiscible fluids as recited in claim 13, wherein said step of charging said first and second fluids is preceded by the pumping of said mixture from a source of said mixture by a pressurized pump.

* * * * *